US010466799B2

(12) United States Patent
Takimoto

(10) Patent No.: US 10,466,799 B2
(45) Date of Patent: Nov. 5, 2019

(54) INFORMATION PROCESSING APPARATUS, INFORMATION PROCESSING METHOD, AND PROGRAM

(71) Applicant: SONY CORPORATION, Tokyo (JP)

(72) Inventor: Yuuji Takimoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 234 days.

(21) Appl. No.: 15/325,154

(22) PCT Filed: Aug. 25, 2015

(86) PCT No.: PCT/JP2015/073909
§ 371 (c)(1),
(2) Date: Jan. 10, 2017

(87) PCT Pub. No.: WO2016/035621
PCT Pub. Date: Mar. 10, 2016

(65) Prior Publication Data
US 2017/0185158 A1 Jun. 29, 2017

(30) Foreign Application Priority Data
Sep. 2, 2014 (JP) .................. 2014-178593

(51) Int. Cl.
*G06F 3/01* (2006.01)
*G06F 3/042* (2006.01)
(Continued)

(52) U.S. Cl.
CPC ............ *G06F 3/017* (2013.01); *G06F 3/0425* (2013.01); *G06F 3/04842* (2013.01); *G06F 3/0481* (2013.01)

(58) Field of Classification Search
CPC .... G06F 3/017; G06F 3/0425; G06F 3/04842; G06F 3/0481
See application file for complete search history.

(56) References Cited

U.S. PATENT DOCUMENTS

| 2009/0077504 A1* | 3/2009 | Bell ....................... G06F 3/011 715/863 |
| 2010/0259473 A1* | 10/2010 | Sakata ................. G06F 3/017 345/156 |

(Continued)

FOREIGN PATENT DOCUMENTS

| JP | 2008-040544 | 2/2008 |
| JP | 2009-087026 | 4/2009 |

(Continued)

*Primary Examiner* — Lixi C Simpson
(74) *Attorney, Agent, or Firm* — Paratus Law Group, PLLC

(57) ABSTRACT

There is provided an information processing apparatus, information processing method, and program which can control display in a display region while preventing the visibility of display in the display region from deteriorating, the information processing apparatus including: a detection unit configured to detect a manipulation of displaying a display object related to an application or changing a display range of the display object in a display region; a determination unit configured to determine a manipulating user who has performed the manipulation when the manipulation has been detected; and a control unit configured to select a display object to be controlled and displayed based on information related to the manipulating user.

15 Claims, 10 Drawing Sheets

(51) Int. Cl.
G06F 3/0484 (2013.01)
G06F 3/0481 (2013.01)

(56) References Cited

U.S. PATENT DOCUMENTS

| | | | |
|---|---|---|---|
| 2013/0069885 A1* | 3/2013 | Davidson | G06F 3/0416 345/173 |
| 2015/0185824 A1* | 7/2015 | Mori | G06F 3/01 345/156 |
| 2016/0026812 A1* | 1/2016 | Kim | G06F 21/84 726/30 |

FOREIGN PATENT DOCUMENTS

| | | |
|---|---|---|
| JP | 2010-026327 | 2/2010 |
| JP | 2013-130915 | 7/2013 |
| JP | 2013-205983 | 10/2013 |
| JP | 2014-178933 | 9/2014 |

* cited by examiner

FIG.3
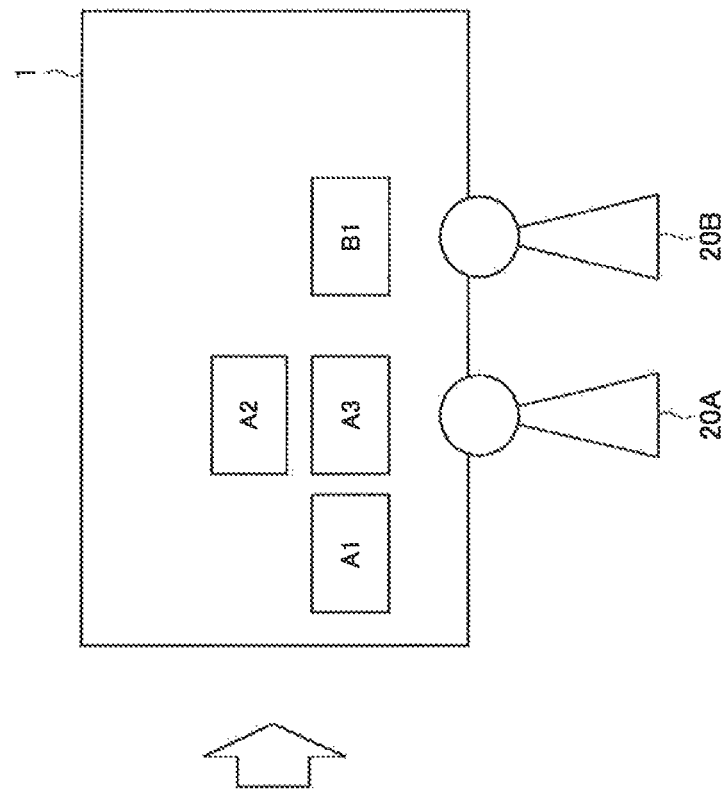
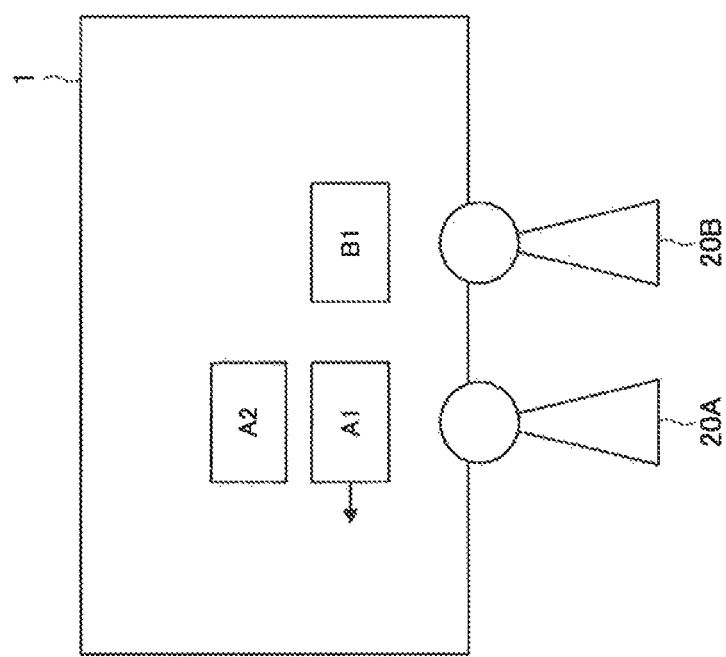

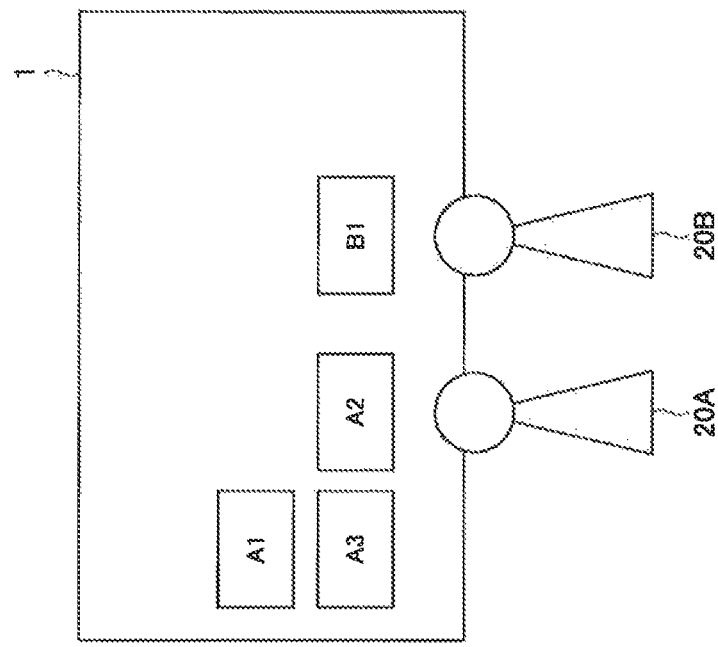
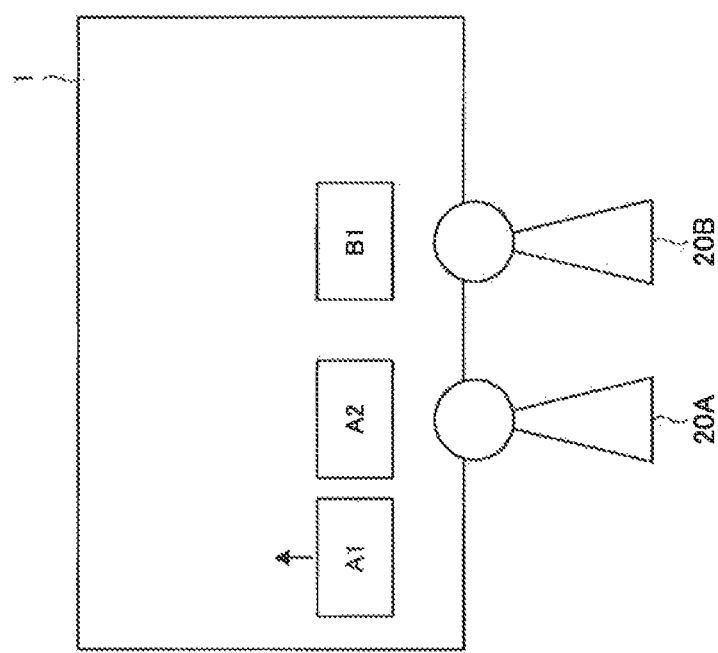
FIG. 5

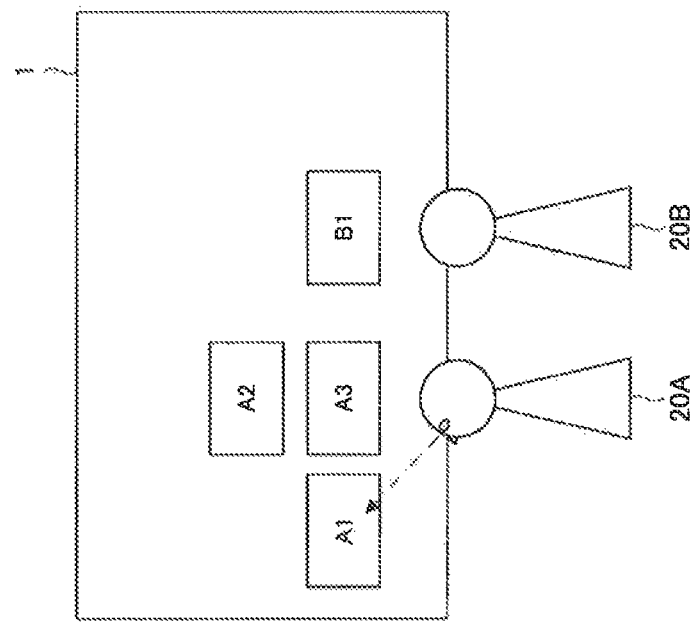
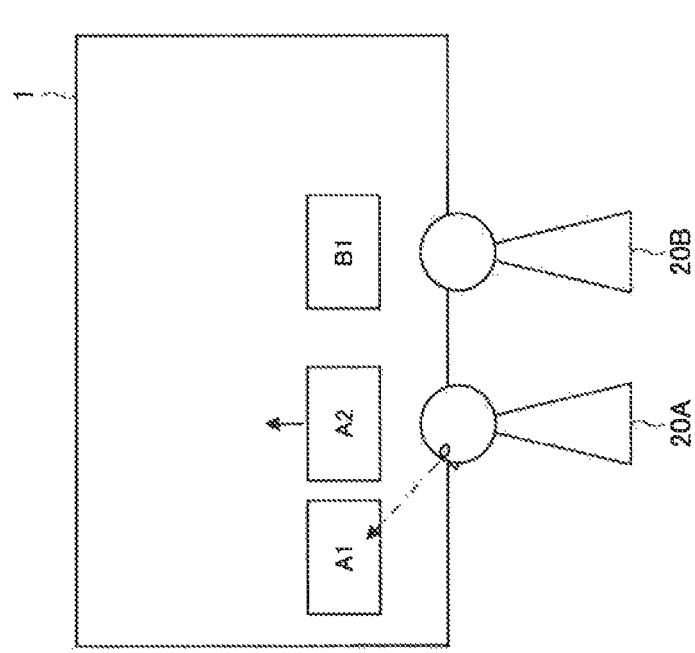
FIG.6

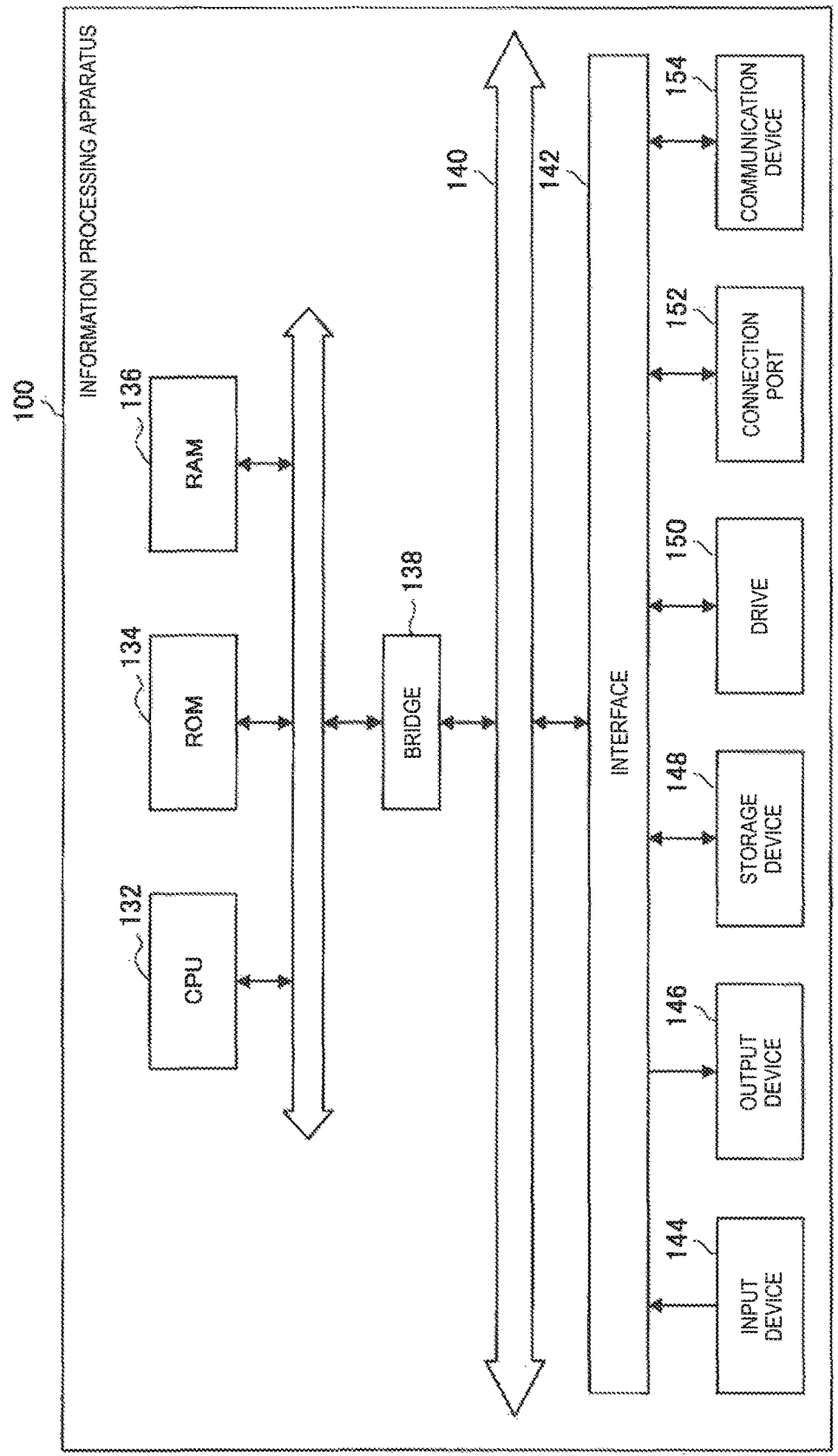

ically known.

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2015/073909 (filed on Aug. 25, 2015) under 35 U.S.C. § 371, which claims priority to Japanese Patent Application No. 2014-178593 (filed on Sep. 2, 2014), which are all hereby incorporated by reference in their entirety.

TECHNICAL FIELD

The present disclosure relates to an information processing apparatus, an information processing method, and a program.

BACKGROUND ART

Recently, as technologies of detecting attitudes or motions (hereinafter also referred to as gestures) of human beings have progressed, technologies of manipulating devices and the like based on gestures of users have been developed. Particularly, a technology in which a manipulation for designating a position through an attitude of the user (hereinafter also referred to as a pointing manipulation) is recognized, and an operation of a device is controlled based on the recognized pointing manipulation is generally known.

For example, Patent Literature 1 discloses an invention relating to an information processing apparatus in which gestures of a hand of a user is recognized based on learned three-dimensional model data of human bodies. According to the technology of Patent Literature 1, a pointing manipulation can be detected based on a recognized gesture of a hand of a user, and a position designated through the detected pointing manipulation can be specified.

CITATION LIST

Patent Literature

Patent Literature 1: JP 2013-205983A

Non-Patent Literature

DISCLOSURE OF INVENTION

Technical Problem

Generally, there may be a plurality of users who perform pointing manipulations, since it is often the case that pointing manipulations are performed on a region in which a display object is displayable (hereinafter also referred to as a display region) and which is larger than users. Consequently, a plurality of display objects related to the pointing manipulations in the display region may be generated, and thus the visibility of display in the display region may be deteriorated.

Accordingly, the present disclosure proposes a novel and improved information processing apparatus, information processing method, and program which can control display in a display region while preventing the visibility of display in the display region from deteriorating.

Solution to Problem

According to the present disclosure, there is provided an information processing apparatus including: a detection unit configured to detect a manipulation of displaying a display object related to an application or changing a display range of the display object in a display region; a determination unit configured to determine a manipulating user who has performed the manipulation when the manipulation has been detected; and a control unit configured to select a display object to be controlled and displayed based on information related to the manipulating user.

According to the present disclosure, there is provided an information processing method including: detecting a manipulation of displaying a display object related to an application or changing a display range of the display object in a display region; determining a manipulating user who has performed the manipulation when the manipulation has been detected; and selecting a display object to be controlled and displayed based on information related to the manipulating user.

According to the present disclosure, there is provided a program causing a computer to implement; a detection function configured to detect a manipulation of displaying a display object related to an application or changing a display range of the display object in a display region; a determination function configured to determine a manipulating user who has performed the manipulation when the manipulation has been detected; and a control function configured to select a display object to be controlled and displayed based on information related to the manipulating user.

Advantageous Effects of Invention

According to the present disclosure as described above, there are provided an information processing apparatus, an information processing method, and a program which can control display in a display region while preventing the visibility of display in the display region from deteriorating. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is a diagram illustrating an example of a display change in a display region according to a process of the information processing apparatus according to the embodiment.

FIG. 5 is a diagram illustrating an example of a display change in a display region according to a process of an information processing apparatus according to a first modified example of the embodiment.

FIG. 6 is a diagram for illustrating an example of a display change in a display region according to a process of an information processing apparatus according to a second modified example of the embodiment.

FIG. 10 is an explanatory diagram illustrating a hardware configuration of the information processing apparatus according to an embodiment of the present disclosure.

MODE(S) FOR CARRYING OUT THE INVENTION

Figure 1:
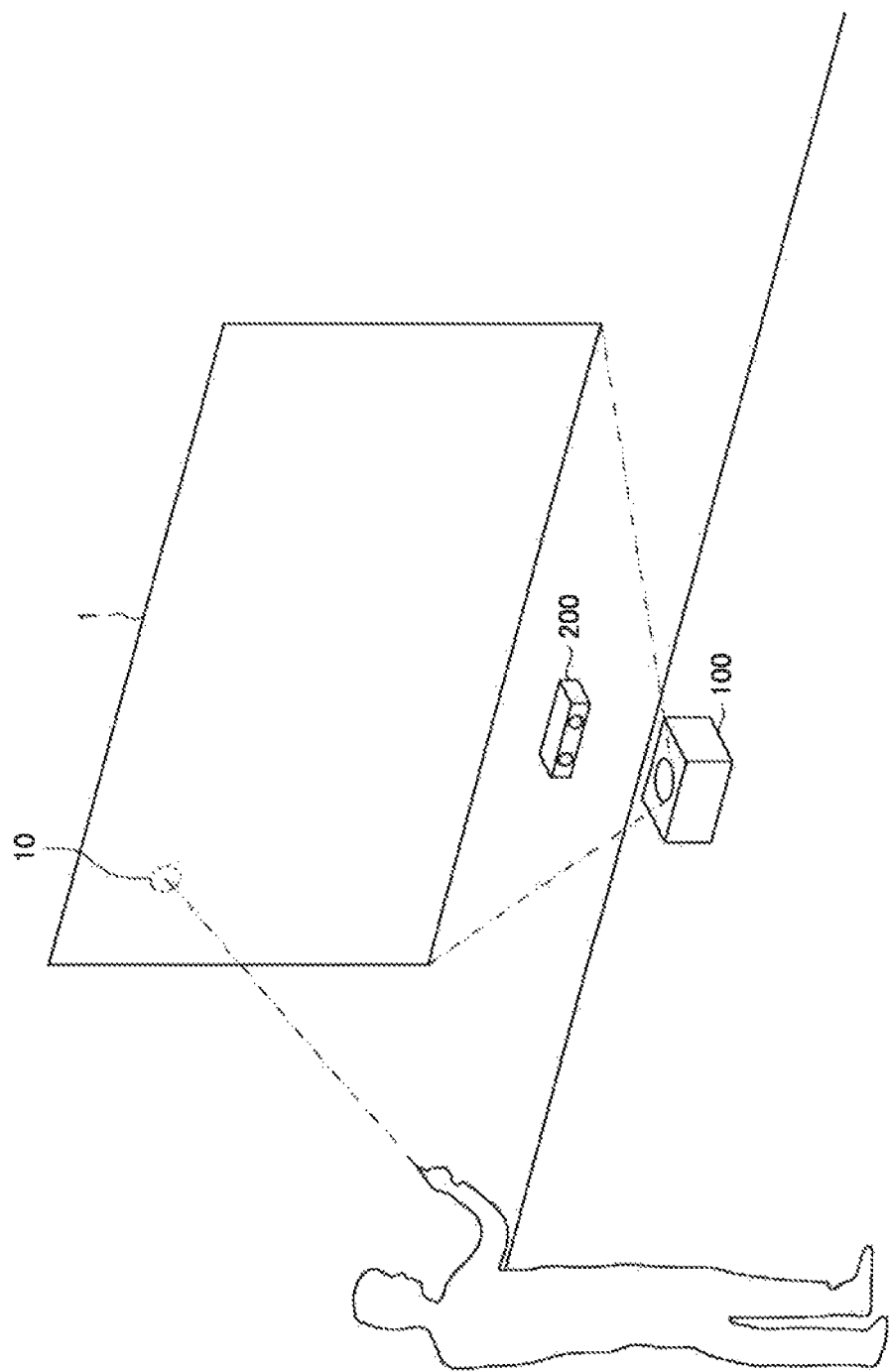
FIG. 1 is a diagram for illustrating an overview of an information processing apparatus according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that the description will be given in the following order.
1. Overview of an information processing apparatus according to an embodiment of the present disclosure
2. First embodiment (Display control based on information of the user who performs a display generation manipulation)
2-1. Configuration of an information processing apparatus
2-2. Process of the information processing apparatus
2-3. Modified example
3. Second embodiment (Display control based on information of a user different from the user who performs a display generation manipulation)
3-1. Configuration of an information processing apparatus
3-2. Process of the information processing apparatus
3-3. Modified example
4. Third embodiment (Display control based on information of a display object)
4-1. Configuration of an information processing apparatus
4-2. Process of the information processing apparatus
4-3. Modified example
5. Hardware configuration of the information processing apparatus according to an embodiment of the present disclosure
6. Conclusion 1. Overview of an Information Processing Apparatus According to an Embodiment of the Present Disclosure First, an overview of an information processing apparatus according to an embodiment of the present disclosure will be described with reference to FIG. 1. FIG. 1 is a diagram for illustrating an overview of an information processing apparatus according to an embodiment of the present disclosure.

The information processing apparatus 100 according to an embodiment of the present disclosure has a manipulation detection function and a display control function. The manipulation detection function is a function of recognizing a gesture of a user and detecting a manipulation corresponding to the gesture. Particularly, a pointing manipulation in a display region is detected through the manipulation detection function. In addition, the display control function is a function of controlling content to be displayed in a display device or the like according to a manipulation. Thus, the information processing apparatus 100 can change display content according to pointing manipulations detected from gestures of a user. Note that the information processing apparatus 100 may have a display device or the like built therein.

For example, the information processing apparatus 100 has a projection function of projecting display content and projects display content in a display region 1 as illustrated in FIG. 1. In addition, an imaging device 200 is disposed so as to image the user who performs manipulations or the like toward the display region 1 and provides an image obtained through the imaging to the information processing apparatus 100. The information processing apparatus 100 detects a manipulation, for example, a pointing manipulation which corresponds to a gesture of the user, for example, a gesture recognized from an attitude of an arm and a hand of the user based on the image provided by the imaging device 200. Then, the information processing apparatus 100 may display a cursor at a position 10 designated through the detected pointing manipulation (hereinafter also referred to as a pointing position) to indicate the pointing position 10.

Generally, there may be a plurality of users who perform pointing manipulations, since it is often the case that pointing manipulations are performed on a display region which is larger than users. Consequently, a plurality of display objects related to the pointing manipulations in the display region may be generated, and thus the visibility of display in the display region may be deteriorated when each display object is controlled and displayed individually. Accordingly, the information processing apparatus 100 according to an embodiment of the present disclosure detects a manipulation such as displaying a display object related to an application in a display region and determines the user who performed the manipulation when the manipulation is detected. Then, the information processing apparatus 100 selects a display object to be controlled and displayed based on information related to the user who performed the manipulation.

For example, upon detecting a user manipulation of starting an application, the information processing apparatus 100 determines the user who performed the manipulation. Next, the information processing apparatus 100 selects any one of display objects already displayed in the display region, for example, a window in a window system or the like based on information related to the determined user. Then, the information processing apparatus 100 performs display control of the selected window, for example, displacement or the like of the window. In addition to performing the display control, the information processing apparatus 100 displays a window of the application related to the starting manipulation in the display region.

As described above, the information processing apparatus 100 according to an embodiment of the present disclosure detects a manipulation such as displaying a display object related to an application in a display region and determines the user who performed the manipulation when the manipulation is detected. Then, the information processing apparatus 100 selects a display object to be controlled and displayed based on information related to the user who performed the manipulation. Thus, even when a display range of a display object on the display region is to be changed due to a manipulation, a display object related to the user who performed the manipulation is controlled and displayed, which allows a display range as the entire display region to be adjusted, and thus deterioration in the visibility in the display region can be prevented. Note that, although a projection device is illustrated in FIG. 1 as an example of the information processing apparatus 100, the information processing apparatus 100 may be a display device such as a display or a television, or a device such as a smartphone, a tablet terminal, a personal computer, or a server connected to a display device. In addition, for the sake of convenience of description, the respective information processing apparatus 100 of the first to third embodiments are discriminated by suffixing numbers corresponding to the embodiments, as in an information processing apparatus 100-1, or an information processing apparatus 100-2.

2. First Embodiment (Display Control Based on Information of the User Who Performs a Display Generation Manipulation)

The overview of an information processing apparatus 100 according to an embodiment of the present disclosure has been described above. Next, an information processing apparatus 100-1 according to a first embodiment of the present disclosure will be described. When a manipulation of displaying a display object is performed, the information processing apparatus 100-1 selects a display object to be controlled and displayed based on information related to the user who performed the manipulation.

2-1. Configuration of an Information Processing Apparatus

Figure 2:
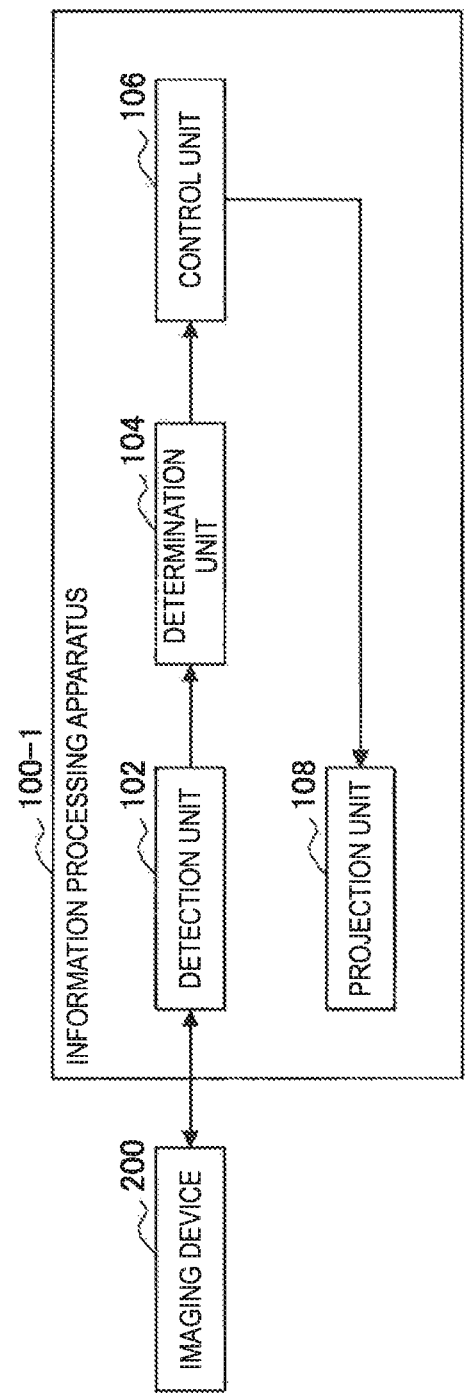
FIG. 2 is a block diagram illustrating a schematic functional configuration of an information processing apparatus according to a first embodiment of the present disclosure.

First, a configuration of the information processing apparatus 100-1 according to the first embodiment of the present disclosure will be described with reference to FIG. 2. FIG. 2 is a block diagram illustrating the schematic functional configuration of the information processing apparatus 100-1 according to the first embodiment of the present disclosure.

The information processing apparatus 100-1 includes a detection unit 102, a determination unit 104, a control unit 106, and a projection unit 108 as illustrated in FIG. 2. Note that the information processing apparatus 100-1 is connected with an imaging device 200 via communication or the like.

The detection unit 102 detects user manipulations. Specifically, the detection unit 102 detects a manipulation of displaying a display object related to an application in a display region (hereinafter also referred to as a display generation manipulation). More specifically, the detection unit 102 detects a display generation manipulation among manipulations executed based on pointing positions related to pointing manipulations performed toward the display region. Hereinbelow, a process of the detection unit 102 will be further described in detail.

First, the detection unit 102 detects a direction of pointing through an attitude of the user (hereinafter also referred to as a pointing direction) based on an image or the like provided by the imaging device 200. Further, the detection unit 102 detects a pointing position based on the pointing direction.

For example, the detection unit 102 makes an imaging request to the imaging device 200 and detects a pointing direction based on an image provided by the imaging device 200 in response to the imaging request and three-dimensional model information of a human body or the like stored in a storage unit additionally provided in the information processing apparatus 100-1. Then, the detection unit 102 detects an intersection of the detected pointing direction and a plane on which display content is projected by the projection unit 108 as a pointing position. For detection of a pointing direction and a pointing position, for example, a technology that uses information obtained from a motion sensor or the like or other general pointing technology as well as a technology that uses an image analysis technology may be used.

Note that a pointing position may be a position to which the user actually points, or a position which is specified based on a position to which the user points. For example, when a plurality of positions to which the user points are estimated, a pointing position may be the center of a circle or the like which includes the estimated positions. In addition, detection of a pointing position may be performed at a predetermined time interval.

Then, the detection unit 102 detects a display generation manipulation among manipulations which are executed based on the detected pointing position. For example, a process object, for example, an activation icon or the like of an application is selected based on the detected pointing position. Then, when a display object, for example, a window is generated upon activation of the application by the selection of the icon, the detection unit 102 detects a selection manipulation of the icon as a display generation manipulation.

The determination unit 104 determines the user who performed the manipulation. Specifically, when the detection unit 102 detects a display generation manipulation, the determination unit 104 determines the user who performed the display generation manipulation. For example, when the detection unit 102 detects a display generation manipulation, the determination unit 104 first obtains information such as images used in the detection process of the detection unit 102. Then, the determination unit 104 specifies the user who performed the display generation manipulation based on information such as obtained images and user information for specifying a user stored in a storage unit provided in the information processing apparatus 100-1. For example, the determination unit 104 specifies a user by using a face recognition technology or the like which performs matching or the like between face information extracted from image information and prestored face information of users. Note that the user information for specifying a user may be obtained from the outside of the information processing apparatus 100-1.

The control unit 106 performs control of display to be projected through the projection unit 108. Specifically, the control unit 106 selects a display object to be controlled and displayed based on information related to the user determined by the determination unit 104. More specifically, the information related to the user includes information in which a user is associated with a display object that is in a predetermined relation with the user (hereinafter also referred to as an association information), and the control unit 106 selects a display object to be controlled and displayed based on the association information. Further, a process of the control unit 106 will be described in detail with reference to FIG. 3. FIG. 3 is a diagram illustrating an example of a display change in a display region according to the process of the information processing apparatus 100-1 according to the embodiment.

First, the control unit 106 displays a display object in the display region. For example, the control unit 106 displays windows A1 and A2 based on a display generation manipulation of a user 20A and a window B1 based on a display generation manipulation of a user 20B as illustrated in the left drawing of FIG. 3.

Then, upon detection of a display generation manipulation, the control unit 106 selects a display object to be controlled and displayed based on association information. For example, the control unit 106 obtains association information when the detection unit 102 detects a display generation manipulation, for example, a manipulation of displaying a window A3. Here, the association information includes information in which the user who generated a window is associated with the window. Consequently, the control unit 106 specifies windows A1 and A2 of which a user 20A determined by the determination unit 104 is the generation user from the obtained association information. Then, the control unit 106 selects the window A1 of which the elapsed time from the generation is longer than that of the other window A2 among the specified windows A1 and A2.

Next, the control unit 106 changes the priority of the selected display object. For example, the control unit 106 may hold and manage the priority for each display object. Then, the control unit 106 lowers the priority of the selected display object, for example, a window A1.

Next, the control unit 106 changes a display position of a display object of which the priority is lower than that of the other display object. Then, the control unit 106 displays a display object related to the display generation manipulation. For example, the control unit 106 selects the window A1 with the lowered priority as a display control target and displaces the selected window A1 to secure a space for displaying a window A3 related to the display generation manipulation as illustrated in the left and right drawings in FIG. 3. Then, the control unit 106 displays the windows A3 related to the display generation manipulation in the vacated space as illustrated in the right drawing of FIG. 3.

Note that the association information is generated and updated by the control unit 106. For example, upon detection of a display generation manipulation, the control unit 106 generates information in which the user who performed the manipulation determined by the determination unit 104 is associated with a display object generated through the display generation manipulation and stores the information in a storage unit.

Here, returning to FIG. 2, the projection unit 108 projects display content based on an instruction of the control unit 106. Specifically, the projection unit 108 projects an image, a video, or the like generated by the control unit 106 toward the projection direction. For example, the projection unit 108 may be a cathode ray tube (CRT), a projector which uses liquid crystal, or the like. Note that the projection unit 108 may be a display unit such as a display which uses liquid crystal or organic electro-luminescence (EL).

In addition, the imaging device 200 performs imaging at a request of the information processing apparatus 100-1. Specifically, upon receiving an imaging request from the detection unit 102, the imaging device 200 performs imaging according to the imaging request and provides an image obtained by the imaging to the information processing apparatus 100-1. For example, the imaging device 200 has two or more imaging units and performs imaging using the respective imaging units. Note that a plurality of imaging devices 200 may be installed, and the respective imaging devices 200 may be connected to the information processing apparatus 100-1. In addition, an installation place of the imaging device 200 is not limited to the lower side of the display region 1 as illustrated in FIG. 1, and the imaging device 200 may be installed at any position at which the user who performs manipulations toward the display region 1 can be imaged as a subject.

2-2. Process of the Information Processing Apparatus

Figure 4:
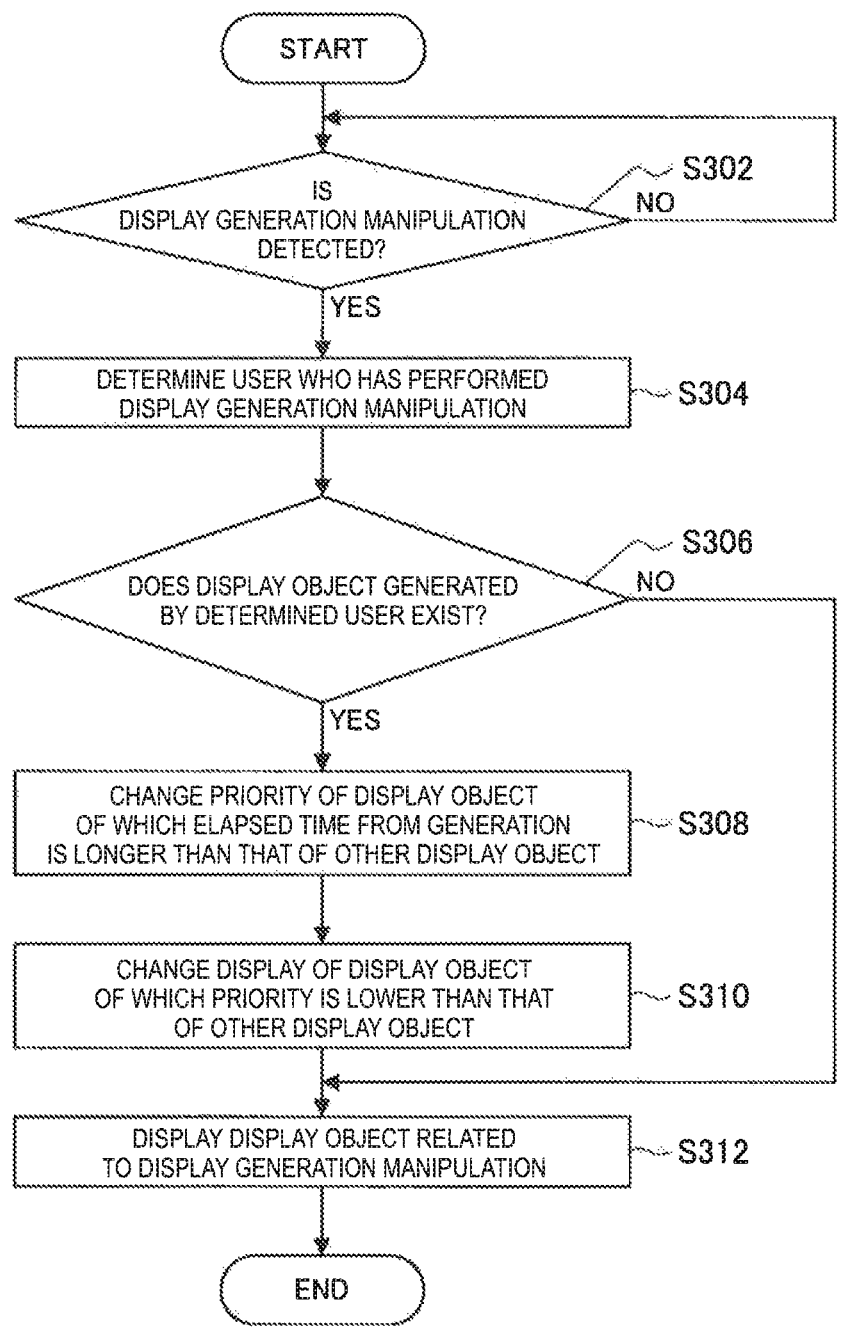
FIG. 4 is a flow chart conceptually showing the process of the information processing apparatus according to the embodiment.

Next, the process of the information processing apparatus 100-1 according to the present embodiment will be described with reference to FIG. 4. FIG. 4 is a flow chart conceptually showing the process of the information processing apparatus 100-1 according to the present embodiment.

First, the information processing apparatus 100-1 waits until a display generation manipulation is detected (step S302). Specifically, the detection unit 102 performs detection of the display generation manipulation based on a pointing manipulation of a user.

When it is determined that a display generation manipulation is detected, the information processing apparatus 100-1 determines the user who performed the display generation manipulation (step S304). Specifically, when it is determined that a display generation manipulation is detected by the detection unit 102, the determination unit 104 obtains information of an image on which the user who performed the display generation manipulation shows up from the detection unit 102. Then, the determination unit 104 determines the user who performed the display generation manipulation based on obtained information of the image.

Next, the information processing apparatus 100-1 determines whether any display object generated by the determined user exists (step S306). Specifically, the control unit 106 obtains association information from a storage unit or the like and determines whether any display object generated by the user determined by the determination unit 104 is included in the obtained association information.

When it is determined that a display object generated by the determined user exists, the information processing apparatus 100-1 changes the priority of a display object of which the elapsed time from the generation is longer than that of the other display object (step S308). Specifically, when it is determined that a display object generated by the user who performed the display generation manipulation is included in the association information, the control unit 106 selects a display object of which the elapsed time from the generation is longer than that of the other display object among display objects indicated by the association information. Then, the control unit 106 lowers the priority of the display object. Note that changing priority may be determined in combination with the presence or absence of manipulations of the display object described below, a manipulation characteristics of an application related to the display object, or the like.

Next, the information processing apparatus 100-1 changes display of a display object of which the priority is lower than that of the other display object (step S310). Specifically, the control unit 106 displaces a display object of which the priority is lower than that of the other display object among display objects associated with the user who performed the display generation manipulation. Note that a plurality of display objects may be selected as display control targets.

Next, the information processing apparatus 100-1 displays a display object related to the display generation manipulation (step S312). Specifically, the control unit 106 displays a display object related to the display generation manipulation in a place which become displayable through displacement of the display object.

As described above, according to the first embodiment of the present disclosure, the information processing apparatus 100-1 detects a manipulation of displaying a display object in a display region and determines the manipulating user who performed the manipulation when the manipulation is detected. Then, the information processing apparatus 100-1 selects a display object to be controlled and displayed based on information related to the manipulating user through the control unit 106. Thus, even when a display range of a display object on the display region is to be changed due to a manipulation, a display object related to the user who performed the manipulation is controlled and displayed, which allows a display range as the entire display region to be adjusted, and thus deterioration in the visibility in the display region can be prevented.

In addition, the information related to the manipulating user described above includes association information in which a user is associated with a display object that is in a predetermined relation with the user, and the control unit 106 selects a display object to be controlled and displayed based on the association information. Thus, a possibility of affecting display of display objects related to the other user can be reduced, thereby the visibility of the display objects related to the other user can be maintained.

In addition, the association information described above includes information in which the user who generated the display object is associated with the display object, and the control unit 106 selects a display object of which the elapsed time from the generation is longer than that of the other display object among display objects generated by the user who performed the display generation manipulation. Thus, selecting display objects to which the user who performed the display generation manipulation may be related allows the possibility of affecting display of display objects related to the other user to be further reduced.

In addition, the control unit 106 changes a display position of the selected display object. Thus, the display object is not erased, thereby deterioration in user convenience can be prevented.

2-3. Modified Examples

The first embodiment of the present disclosure has been described above. Note that the embodiment is not limited to the above-described example. Hereinafter, first to fourth modified examples of the embodiment will be described.

First Modified Example

As the first modified example of the present embodiment, the information processing apparatus 100-1 may select a display object to be controlled and displayed based on a position of a user with respect to a display region. Specifically, the association information includes information indicating a positional relation between a display object associated with a user and the user (hereinafter also referred to as a positional relation information), and the control unit 106 selects a display object to be controlled and displayed based on the positional relation information on the user who performed the display generation manipulation. Further, a process of the present modified example will be described in detail with reference to FIG. 5. FIG. 5 is a diagram illustrating an example of a display change in a display region according to a process of the information processing apparatus 100-1 according to the first modified example of the embodiment. Note that description of processes that are substantially the same as those of the first embodiment will be omitted.

First, the control unit 106 displays a display object in the display region. For example, the control unit 106 displays windows A1 and A2 associated with a user 20A and a window B1 associated with a user 20B as illustrated in the left drawing of FIG. 5.

Then, upon detection of a display generation manipulation, the control unit 106 selects a display object to be controlled and displayed based on a positional relation information of the user who performed the display genera- tion manipulation. For example, the control unit 106 obtains association information when the detection unit 102 detects a display generation manipulation for a window A3 by the user 20A. Then, the control unit 106 obtains a positional relation information of the user who performed the display generation manipulation determined by the determination unit 104 from the obtained association information. Here, the positional relation information includes information indicating a distance between a display object associated with a user and the user. Consequently, the control unit 106 specifies respective distances between each of the windows A1 and A2 associated with the user 20A and the user 20A. Then, the control unit 106 selects the window A1 of which the distance from the user 20A is longer than that of the other window among the windows A1 and A2. Note that the positional relation information may be detected by a process such as image analysis of the detection unit 102 or may be obtained by using a distance sensor or the like additionally provided in the information processing apparatus 100-1. In addition, the positional relation information may be obtained from the outside of the information processing apparatus 100-1.

Next, the control unit 106 changes the priority of the selected display object and displaces a display object of which the priority is lower than that of the other display object. Then, the control unit 106 displays a display object related to the display generation manipulation. For example, the control unit 106 lowers the priority of the selected window A1 and displaces the window A1 with the lowered priority as illustrated in the left and right drawings in FIG. 5. Then, the control unit 106 displays the windows A3 related to the display generation manipulation in the vacated space.

As described above, according to the first modified example of the embodiment, the association information includes positional relation information indicating a positional relation between a display object associated with a user and the user, and the control unit 106 selects a display object to be controlled and displayed based on the positional relation information on the user who performed the display generation manipulation. Thus, the display object is selected based on information in which a utilization state of a display object is more likely to be reflected, thereby deterioration in user convenience due to the display control can be prevented.

In addition, the positional relation information described above includes information indicating a distance between a display object associated with a user and the user, and the control unit 106 selects a display object which is specified based on the distance among display objects associated with the user who performed the display generation manipulation. Thus, the display object is selected based on information in which the utilization state is estimated more accurately, thereby deterioration in user convenience can be prevented.

Note that, although the example in which the positional relation information includes information indicating a distance between a display object associated with a user and the user has been described above, the positional relation information may include information indicating an angle of a line segment between the display object and the position of the user relative to the display region. For example, the control unit 106 obtains an angle information indicating an angle between a line segment from the display object associated with the user determined by the determination unit 104 to the position of the user and the display surface of the display region. Then, the control unit 106 selects a display object of which an angle that is indicated by the obtained angle information is smaller than that of the other display object. In this case, the utilization state which is difficult to estimate by using the distance between the user and the display object can be estimated, thereby occurrence of deterioration in user convenience can be prevented.

Second Modified Example

As the second modified example of the present embodiment, the information processing apparatus 100-1 may select a display object to be controlled and displayed based on a state of a user. Specifically, the association information includes information indicating a state of a user with respect to a display object associated with the user (hereinafter also referred to as a user state information), and the control unit 106 may select a display object to be controlled and displayed based on the user state information for the user who performed the display generation manipulation. Further, a process of the present modified example will be described in detail with reference to FIG. 6. FIG. 6 is a diagram for illustrating an example of a display change in a display region according to a process of the information processing apparatus 100-1 according to the second modified example of the embodiment. Note that description of processes that are substantially the same as those of the first embodiment will be omitted.

First, the control unit 106 displays a display object in the display region. For example, the control unit 106 displays windows A1 and A2 associated with a user 20A and a window B1 associated with a user 20B as illustrated in the left drawing of FIG. 6.

Then, upon detection of a display generation manipulation, the control unit 106 selects a display object to be controlled and displayed based on a user state information of the user who performed the display generation manipulation. For example, the control unit 106 obtains association information when the detection unit 102 detects a manipulation of displaying a window A3. Then, the control unit 106 obtains a user state information of a user 20A who performed the display generation manipulation from the obtained association information. Here, the user state information includes information indicating the presence or absence of motions of the user with respect to the display object associated with the user. Consequently, the control unit 106 specifies the presence or absence of motions of the user 20A with respect to the windows A1 and A2 associated with the user 20A, for example, a gaze at a window. For example, the control unit 106 selects the window A2 which is not gazed at as illustrated in the left drawing of FIG. 6. Note that the information indicating the presence or absence of motions of the user with respect to the display object may be detected by the process such as image analysis of the detection unit 102, or obtained from an external device of the information processing apparatus 100-1.

Next, the control unit 106 changes the priority of the selected display object and displaces a display object of which the priority is lower than that of the other display object. Then, the control unit 106 displays a display object related to the display generation manipulation. For example, the control unit 106 lowers the priority of the selected window A2 and displaces the window A2 as illustrated in the left and right drawings in FIG. 6. Then, the control unit 106 displays the windows A3 related to the display generation manipulation in the vacated space.

As described above, according to the second modified example of the embodiment, the association information includes user state information indicating a state of a user with respect to a display object associated with a user, and the control unit 106 selects a display object to be controlled and displayed based on the user state information on the user who performed the display generation manipulation. Thus, the display object is selected based on a utilization state of the display object which is difficult to estimate by using the positional relation between the user and the display object, thereby possibility of affecting user due to the display control can be further reduced.

In addition, the user state information includes information indicating the presence or absence of motions of the user with respect to the display object associated with the user, and the control unit 106 selects a display object which is specified based on the presence or absence of the motion among display objects associated with the user who performed the display generation manipulation. Thus, the display object is selected based on information which enables estimating the presence or absence of the user's interest with respect to the display object more accurately, thereby the accuracy of the selection process can be improved.

Note that, although the example in which the user state information includes information indicating the presence or absence of a gaze of a user with respect to a display object associated with the user has been described above, the user state information may include information indicating the presence or absence of operations of the user with respect to the display object. For example, when a display generation manipulation is performed, the control unit 106 selects a display object which is not manipulated for a predetermined time period among display objects associated with the user who performed the display generation manipulation. In this case, the display object which is estimated to have lost the user's interest is displaced, thereby the user convenience can be maintained and display objects can be organized. Note that display objects which receive no manipulation may be excluded from the process.

Third Modified Example

As the third modified example of the present embodiment, the information processing apparatus 100-1 may select a display object to be controlled and displayed when detecting a manipulation other than a display generation manipulation. Specifically, when a manipulation of changing a display range of a display object in the display region is performed, the control unit 106 selects a display object to be controlled and displayed based on information related to the user who performed the manipulation.

For example, the detection unit 102 detects a manipulation of changing a display size of a display object, a manipulation of terminating display of a display object, or the like, and the determination unit 104 determines the user who performed the detected manipulation. Then, the control unit 106 refers to association information to select a display object associated with the determined user.

In addition, when a manipulation of displacing a display object is performed, the control unit 106 may select a display object to be controlled and displayed based on information related to the user who performed the manipulation.

As described above, according to the third modified example of the embodiment, when a manipulation of changing a display range of the display object in the display region or a manipulation of displacing a display object is performed, the control unit 106 selects a display object to be controlled and displayed based on information related to the user who performed the manipulation. Thus, the display control with respect to manipulations in general which may affect the visibility of display objects displayed on the display region may be performed, thereby preventing the visibility from deteriorating can be facilitated.

Note that, although the example in which the display object is selected when a manipulation by a user is performed has been described above, the display object may be selected automatically. For example, the control unit 106 may execute a selection process of display objects with a predetermined time period or upon occurrence of a predetermined event.

3. Second Embodiment (Display Control Based on Information of a User Different from the User Who Performs a Display Generation Manipulation)

The information processing apparatus 100-1 according to the first embodiment of the present disclosure has been described above. Next, an information processing apparatus 100-2 according to a second embodiment of the present disclosure will be described. The information processing apparatus 100-2 selects a display object to be controlled and displayed based on information related to a user different from the user of the display generation manipulation.

3-1. Configuration of an Information Processing Apparatus

The functional configuration of the information processing apparatus 100-2 is substantially the same as that according to the first embodiment, but the function of the control unit 106 is partially different. Note that description of functions that are substantially the same as those of the first embodiment will be omitted.

The control unit 106 updates the association information. Specifically, the control unit 106 instructs the detection unit 102 to detect a state of a user at a predetermined time interval and updates the association information based on information indicating the detected state of the user. For example, the association information may have information for each relation between a user and a display object. The association information includes, for example, information indicating an association with a user who has a predetermined relation to the other display object, for example, a manipulating user, a viewing user, or the like as well as information indicating an association with the user who generated a display object. Then, when the detected state of the user indicates a relation related to an association with a display object, for example, a manipulation or the like of the display object, the control unit 106 adds an association with a display object in which the user is the manipulating user to the association information.

Figure 7:
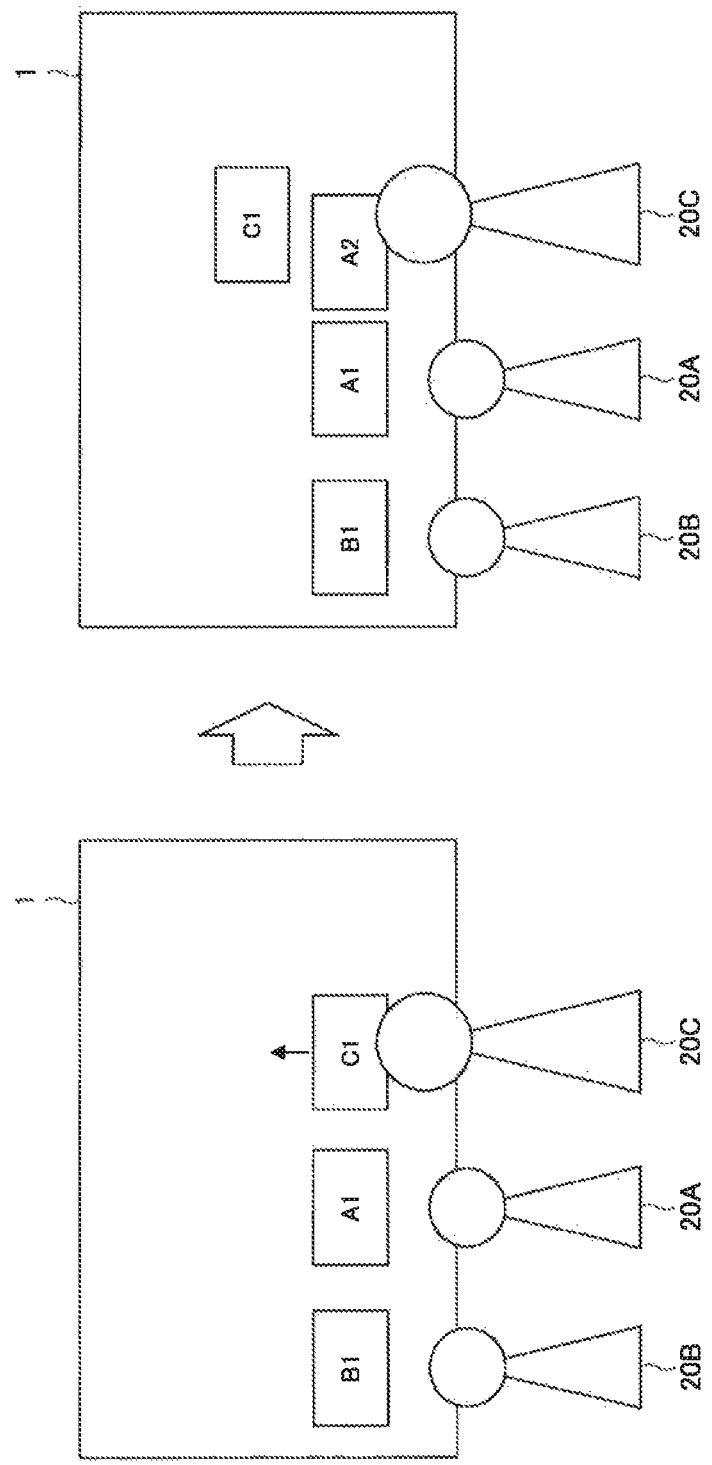
FIG. 7 is a diagram illustrating an example of a display change in a display region according to a process of an information processing apparatus according to a second embodiment of the present disclosure.

In addition, the control unit 106 selects a display object to be controlled and displayed based on the association information for the user who performed the display generation manipulation and a user different from the user. Specifically, the association information includes information indicating a characteristic of a user (hereinafter also referred to as a user characteristic information), and the control unit 106 selects a display object to be controlled and displayed based on the user characteristic information. Further, a process of control unit 106 of the present embodiment will be described in detail with reference to FIG. 7. FIG. 7 is a diagram illustrating an example of a display change in a display region according to the process of the information processing apparatus 100-2 according to the embodiment.

First, the control unit 106 displays a display object in the display region. For example, the control unit 106 displays windows A1, B1, and C1 associated with users 20A, 203, and 20C as illustrated in the left drawing of FIG. 7.

Then, upon detection of a display generation manipulation, the control unit 106 selects a display object to be controlled and displayed based on a user characteristic information of the user associated with the display object. For example, the control unit 106 obtains association information upon detection of a display generation manipulation for the window A2 by the user 20A. Then, the control unit 106 obtains a user characteristic information of the user associated with the display object from the obtained association information. Here, the user characteristic information includes information which represents a physical characteristic, for example, the body height of the user. Consequently, the control unit 106 specifies the user of which a body height is taller than that of the other user among the specified users. For example, the control unit 106 may obtain information indicating body heights of the users 20A-20C associated with the windows A1-C1, respectively and may specify the user 20C of which the body height indicated by the obtained information is taller than that of the other user. Then, the control unit 106 selects the window C1 associated with the specified user 20C. Note that the user characteristic information may be obtained by the detection unit 102 or may be obtained from an external device of the information processing apparatus 100-2.

Next, the control unit 106 changes the priority of the selected display object and displaces a display object of which the priority is lower than that of the other display object. Then, the control unit 106 displays a display object related to the display generation manipulation. For example, the control unit 106 lowers the priority of the selected window C1 and displaces the window C1 as illustrated in the left and right drawings in FIG. 7. Then, the control unit 106 displays the windows A2 related to the display generation manipulation in the vacated space.

Note that, although the example in which the user characteristic information is information indicating a body height as a physical characteristic has been described above, the user characteristic information may be information indicating the age, sex, eyesight, or the like of the user.

3-2. Process of the Information Processing Apparatus

Figure 8:
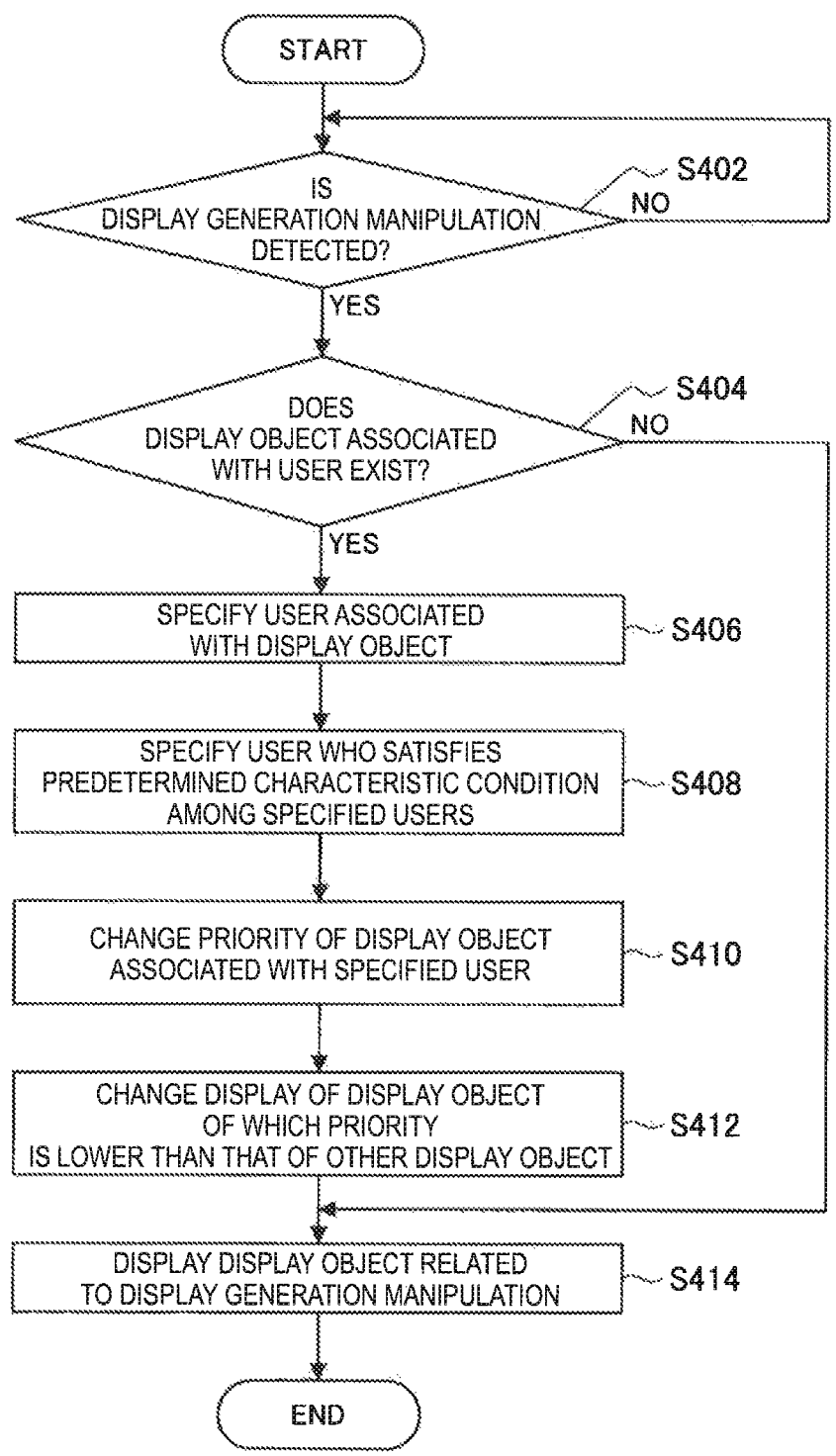
FIG. 8 is a flow chart conceptually showing the process of the information processing apparatus according to the embodiment.

Next, the process of the information processing apparatus 100-2 according to the present embodiment will be described with reference to FIG. 8. FIG. 8 is a flow chart conceptually showing the process of the information processing apparatus 100-2 according to the present embodiment. Note that description of processes that are substantially the same as those of the first embodiment will be omitted.

First, the information processing apparatus 100-2 waits until a display generation manipulation is detected (step S402).

When a display generation manipulation is detected, the existence of a display object associated with a user is determined (step S404). Specifically, the control unit 106 obtains association information when the detection unit 102 detects a display generation manipulation. Then, the control unit 106 determines whether a display object associated with a user exists in the obtained association information.

When it is determined that a display object associated with a user exists, the information processing apparatus 100-2 specifies a user associated with the display object (step S406). Specifically, when it is determined that a display object associated with a user exists in the association information, the control unit 106 specifies a user associated with the display object by referring to the association information.

Next, the user who satisfies a predetermined characteristic condition is specified among the specified users (step S408). Specifically, the control unit 106 obtains a user characteristic information of the specified user from the obtained association information and specifies a user of which a physical characteristic indicated by the obtained user characteristic information satisfies a predetermined condition. Note that there may be a plurality of specified users.

Next, the priority of the display object associated with the specified user is changed (step S410). Specifically, the control unit 106 selects a display object associated with the specified user and lowers the priority of the selected display object.

Next, display of the display object of which the priority is lower than that of the other display object is changed (step S412), and a display object related to the display generation manipulation is displayed (step S414).

As described above, according to the second modified example of the embodiment, the information processing apparatus 100-2 selects a display object to be controlled and displayed based on the association information for the user who performed the display generation manipulation and a user different from the user. Thus, the display control target is expanded and the display object that is suitable for the display control is selected, thereby impact on users due to the display control can be further curbed.

In addition, the association information described above includes user characteristic information, and the control unit 106 selects a display object to be controlled and displayed based on the user characteristic information. Thus, the display control is performed based on information that is less susceptible during user's utilization, thereby the display control can be stabilized.

In addition, the user characteristic information described above includes information indicating a physical characteristic of a user, and the control unit 106 selects a display object which is specified based on the physical characteristic of the user among display objects associated with the user.

Note that, although the example in which the control unit 106 selects a display object to be controlled and displayed based on a user characteristic information has been described above, the control unit 106 may select a display object based on a positional relation between the display region and the user. For example, the control unit 106 selects a display object based on a distance between the user and the display region.

In addition, the control unit 106 may select a display object based on a manipulation state of the display object. For example, when a manipulating user associated with a display object is not detected for a predetermined time period, the control unit 106 selects a display object. Meanwhile, when there are a plurality of manipulating users of a display object, the control unit 106 may raise the priority of the display object to make the display object to be difficult to become a display control target.

In addition, the control unit 106 may select a display object based on the positional relation between a user and the display object associated with the user similar to the first modified example of the first embodiment or may select a display object based on the state information of the user similar to the second modified example.

3-3. Modified Examples

The second embodiment of the present disclosure has been described above. Note that the embodiment is not limited to the above-described example. Hereinafter, modified examples of the embodiment will be described.

As a modified example of the embodiment, the information processing apparatus 100-1 may perform change of a display position, that is, a display control other than displacement of a display object. Specifically, the control unit 106 changes the size of a display object. For example, the control unit 106 may reduce or magnify the size of a window according to the priority of the window. In addition, the control unit 106 may terminate display of a display object. For example, the control unit 106 may close a window of which the priority is lower than that of the other window.

For example, the control unit 106 may reduce the size of a display object of which the distance from the associated user is closer than that of the other display object. In addition, the control unit 106 may reduce the size of a display object which is associated with a user whose distance from the display region is closer than that of the other user. In these cases, since the user is close to the display object, the degree of the visibility deterioration due to the reduction is small, and thus the user is less affected.

In addition, for example, the control unit 106 may reduce the size of a display object when a manipulation success rate of a user associated with the display object is, above a threshold. In this case, the user may possibly be a skilled user or a dexterous user, and thus the manipulation performance is hardly decreased when the display object is reduced in size.

In addition, for example, when a generation user associated with the display object is not detected for a predetermined time period or when a manipulation or line-of-sight for a display object is not detected for a predetermined time period, the control unit 106 may reduce the size of the display object or may terminate display of the display object. In these cases, the user's interest for the display object may possibly be decreased, and thus the reduction or termination of the display object is not likely to give inconvenience to the user.

In addition, for example, the control unit 106 may display control on a display object of which the priority is higher than that of the other display object when the termination manipulation of the display object or the reduction manipulation of the display object is performed. For example, the control unit 106 may magnify the size of a display object of which the priority is higher than that of the other display object. In this case, the visibility of the display object with a higher priority can be improved.

Further, the control unit 106 may change the degree of change for the display object according to the user associated with the display object. For example, the control unit 106 may change an amount of display change, for example, an amount of displacement, or a reduction rate or a magnification rate of the display object based on information related to the user associated with the display object selected as the display control target, for example, information such as a manipulation frequency, a manipulation time, the number or type of the associated display object, or the like. In addition, the control unit 106 may change the amount of display change according to whether the user is a certain person.

As described above, according to the modified example of the embodiment, the control unit 106 changes the size of the selected display object. Thus, the display object would not be displaced, thereby deterioration degree of the visibility for the display object can be curbed.

In addition, the control unit 106 terminates display of the selected display object. Thus, a display object which has a low priority is terminated, thereby enabling effective use of calculation resources and reduction of processing load related to the display in the display region.

In addition, the control unit 106 changes the degree of change for the display object according to the user associated with the display object. Thus, a suitable display control for each user may be performed, thereby each user's convenience can be improved.

4. Third Embodiment (Display Control Based on Information of a Display Object)

The information processing apparatus 100-2 according to the second embodiment of the present disclosure has been described above. Next, an information processing apparatus 100-3 according to a third embodiment of the present disclosure will be described. The information processing apparatus 100-3 selects a display object to be controlled and displayed based on information related to the display object.

4-1. Configuration of an Information Processing Apparatus

The functional configuration of the information processing apparatus 100-3 is substantially the same as that according to the first embodiment, but the function of the control unit 106 is partially different. Note that description of functions that are substantially the same as those of the first and second embodiments will be omitted.

The control unit 106 selects a display object to be controlled and displayed based on application characteristic information indicating a characteristic of an application related to the display object. Specifically, the control unit 106 selects a display object related to an application in which the manipulation characteristic satisfies a predetermined condition.

For example, upon detection of a display generation manipulation, the control unit 106 obtains information indicating a manipulation characteristic of an application related to the display object (hereinafter also referred to as a manipulation characteristic information). Then, the control unit 106 selects a display object related to an application of which the required accuracy of manipulation indicated by the obtained manipulation characteristic information is lower than that of the other display object. Then, the control unit 106 lowers the priority of the selected display object and display controls for the display object of which the priority is lower than that of the other display object. For example, the manipulation characteristic information may be pre-stored in a storage unit.

Note that the required accuracy of manipulation may be a category or a numerical value, and when the required accuracy of manipulation is a predetermined category, numerical value, or the like, the control unit 106 may select a display object related to an application which has the required accuracy of manipulation.

4-2. Process of the Information Processing Apparatus

Figure 9:
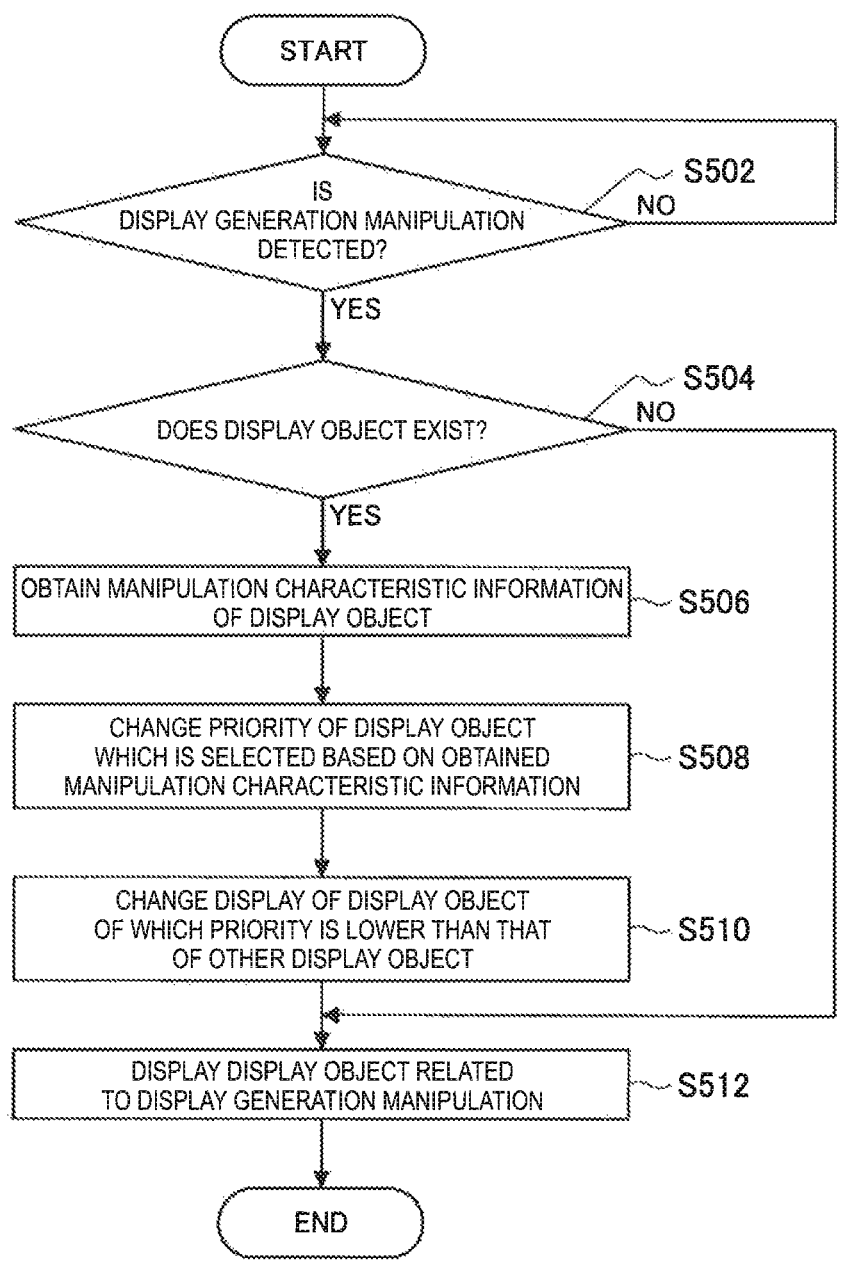
FIG. 9 is a flow chart conceptually showing a process of an information processing apparatus according to a third embodiment of the present disclosure.

Next, the process of the information processing apparatus 100-3 according to the present embodiment will be described with reference to FIG. 9. FIG. 9 is a flow chart conceptually showing the process of the information processing apparatus 100-3 according to the present embodiment. Note that description of processes that are substantially the same as those of the first and second embodiments will be omitted.

First, the information processing apparatus 100-3 waits until a display generation manipulation is detected (step S502).

When a display generation manipulation is detected, the information processing apparatus 100-3 determines whether a display object exists (step S504). Specifically, the control unit 106 determines whether one or more display objects are displayed in the display region.

When it is determined that a display object exists, the information processing apparatus 100-3 obtains manipulation characteristic information of the display object (step S506). Specifically, the control unit 106 obtains manipulation characteristic information from a storage unit for each of the display objects when it is determined that display objects are displayed.

Next, the information processing apparatus 100-3 changes the priority of the display objects which is selected based on the obtained manipulation characteristic information (step S508). Specifically, the control unit 106 selects a display object of which the required accuracy of manipulation of the application indicated by the obtained manipulation characteristic information is lower than that of the other display object. Then, the control unit 106 lowers the priority of the selected display object.

Next, the information processing apparatus 100-3 changes display of the display object of which the priority is lower than that of the other display object (step S510), and displays a display object related to the display generation manipulation (step S512).

As described above, according to the third embodiment of the present disclosure, a display object to be controlled and displayed is selected based on the application characteristic information indicating the characteristic of the application related to the display object. Thus, the display object is selected based on information of the application closely related to the manipulation of the display object, thereby deterioration in manipulation performance can be prevented:

In addition, the control unit 106 selects a display object related to an application in which the manipulation characteristic satisfies a predetermined condition. Thus, the display control is performed according to the manipulation characteristic among the characteristics of the application, thereby deterioration in manipulation performance can be further prevented.

Note that, although the example in which the control unit 106 selects a display object based on the manipulation characteristic of the application related to the display object has been described above, the control unit 106 may select a display object based on the presence or absence of a manipulation request of the application related to the display object.

For example, when an application related to the display object is an application which does not require any manipulation, the control unit 106 selects a display object. In addition, the control unit 106 may select a display object related to an application in which there are less manipulation requests such as, for example, a moving image reproduction application of which the GUI related to manipulations of buttons or the like is less than that of the other application. Then, the control unit 106 may reduce the size of the display object. The control unit 106 may select a display object based on only whether it is the display object related to a predetermined application such as a moving image reproduction application or the like.

In these cases, a display object related to an application in which less manipulations are performed, thereby a deterioration of the manipulation performance can be prevented, and the visibility of display in the display region can be improved.

In addition, although the example in which characteristic information of an application related to the display object is utilized has been described above, content characteristic or the like related to the display object may be used. For example, the control unit 106 may select a display object based on attitude information, meta information, contents, or the like of content associated with the display object.

4-3. Modified Examples

The third embodiment of the present disclosure has been described above. Note that the embodiment is not limited to the above-described example. Hereinafter, modified examples of the embodiment will be described.

As a modification of the embodiment, the information processing apparatus 100-3 may select a display object to be controlled and displayed based on information indicating a display state of the display object. Specifically, the control unit 106 selects a display object to be controlled and displayed based on a display position of the display object.

(Process Based on a Display Position of a Display Object)

For example, the control unit 106 obtains a display position of a display object when a display generation manipulation is detected. Then, the control unit 106 selects the display object when the display position of the obtained display object is in a predetermined position. For example, the predetermined position may be a position adjacent to the end of the display region, a position of which the degree of recognition due to the hardware characteristics is lower than that of the other position, or the like.

(Process Based on a Display State of a Display Object)

In addition, the control unit 106 may select a display object to be controlled and displayed based on a display state of a display object. For example, upon detection of a display generation manipulation, the control unit 106 obtains a display position of the display object and a range in which the display object should be displayed and specifies a display range of the display object actually displayed in the display region. Then, the control unit 106 selects the display object when a ratio of the display range being displayed to the display range that should be displayed is less than or equal to a predetermined ratio, for example, when it is in a state that the display object is displayed at the end of the display region and a part of the display object is beyond the display range.

As described above, according to the modified example of the embodiment, the control unit 106 selects a display object to be controlled and displayed based on information indicating the display state of the display object. Thus, a display object is selected based on a degree of the user's interest with respect to the display object which is estimated from the display state of the display object, thereby impact on users due to the display control can be curbed.

5. Hardware Configuration of the Information Processing Apparatus According to an Embodiment of the Present Disclosure The embodiments of the present disclosure have been described above. The processes of the information processing apparatus 100 described above are realized through cooperation of software and the hardware of the information processing apparatus 100 to be described below.

FIG. 10 is an explanatory diagram illustrating a hardware configuration of the information processing apparatus 100 according to an embodiment of the present disclosure. As illustrated in FIG. 10, the information processing apparatus 100 includes a central processing unit (CPU) 132, a read-only memory (ROM) 134, a random access memory (RAM) 136, a bridge 138, a bus 140, an interface 142, an input device 144, an output device 146, a storage device 148, a drive 150, a connection port 152, and a communication device 154.

The CPU 132 functions as an arithmetic processing unit and a control unit and realizes an operation of the detection unit 102, the determination unit 104, and the control unit 106 in the information processing apparatus 100 in cooperation with various programs. In addition, the CPU 132 may be a microprocessor. The ROM 134 stores programs, arithmetic parameters, or the like used by the CPU 132. The RAM 136 temporarily stores programs used in execution of the CPU 132 or parameters or the like properly changed in execution thereof. A part of the storage unit in the information processing apparatus 100 is realized by the ROM 134 and the RAM 136. The CPU 132, the ROM 134, and the RAM 136 are interconnected by an internal bus configured by a CPU bus or the like.

The input device 144 is configured to include an input unit, such as a mouse, a keyboard, a touch panel, a button, a microphone, a switch, a lever, and the like used for the user to input information, and an input control circuit which generates an input signal based on an input by the user and outputs the input signal to the CPU 132. The user of the information processing apparatus 100 can input various kinds of data or can give an instruction of a processing operation to the information processing apparatus 100 by manipulating the input device 144.

The output device 146 performs output to the projection unit 108 of the information processing apparatus 100, for example, such a device as a liquid crystal display (LCD) device, an organic light emitting diode (OLED) device, or a lamp. Further, the output device 146 may perform audio output for a speaker, a headphone, and the like.

The storage device 148 is a device for storing data. The storage device 148 may include a storage medium, a recording device recording data on a storage medium, a reading device reading data from a storage medium, a deletion device deleting data recorded on a storage medium, and the like. The storage device 148 stores programs executed by the CPU 132 or various kinds of data.

The drive 150 is a reader-writer for storage media and built in the information processing apparatus 100 or attached externally. The drive 150 reads information stored in a removable storage medium such as a loaded magnetic disk, optical disc, magneto-optical disc, a semiconductor memory, or the like and outputs the information to the RAM 134. In addition, the drive 150 can also write information on the removable storage medium.

The connection port 152 is a bus connected to an external information processing apparatus or a peripheral device of the information processing apparatus 100, for example. The connection port 152 may be a Universal Serial Bus (USB).

The communication device 154 is a communication interface configured with a communication device for establishing a connection with a network, for example. The communication device 154 may be a device supporting infrared communication, a communication device supporting a wireless local area network (LAN), a communication device supporting Long Term Evolution (LTE), or a wired communication device performing communication in a wired manner.

6. Conclusion

As described above, according to the first embodiment of the present disclosure, even when the display range of the display object on the display region is changed due to a manipulation, the display control of the display object associated with the user who performed the manipulation allows adjusting the display range as the entire display region, thereby deterioration of the visibility in the display region can be prevented. In addition, according to the second embodiment of the present disclosure, the display control target is expanded and the display object that is suitable for the display control is selected, thereby impact on users due to the display control can be further curbed. In addition, according to the third embodiment of the present disclosure, the display object is selected based on information of the application closely related to the manipulation of the display object, thereby deterioration in manipulation performance can be prevented.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although the control unit 106 lowers the priority of the selected display object and display controls for a display object of which the priority is lower than that of the other display object in the above embodiments, the present disclosure is not limited to the above examples. For example, the control unit 106 may display control for the selected display object. In this case, a display control of a display object is performed without processing priorities, thereby enabling speed-up of processes and reduction of calculation resources. Note that when processing with priority, a display control of a display object is performed for a display object, among the selected display objects, of which the priority is lower than that of the selected display objects, thereby the results of the selection processes of a plurality of display objects can be combined. For example, the control unit 106 may combine a result of a selection process based on the elapsed time from the generation of the display object, and a result of a selection process based on the presence or absence of manipulations of the display object or a result of a selection process based on the manipulation characteristic of the display object to change priorities.

In addition, although the example in which the detection unit 102 detects a manipulation based on a pointing manipulation has been described in the above embodiments, the detection unit 102 may detect a manipulation based on the other gesture manipulation.

In addition, although the example in which the control unit 106 selects a display object upon detection of the display generation manipulation or the like has been described in the above embodiments, the control unit 106 may determine whether to execute the display control or not upon detection of the display generation manipulation or the like. For example, upon detection of a display generation manipulation by the detection unit 102, the control unit 106 determines whether to execute a selection process of the display object to be controlled and displayed or not based on a display situation of the display region, for example, the size of a region in which a display object is not displayed, the number of display objects, or the like. In this case, a selection process of the display object is performed only when it is appropriate, thereby deterioration of the visibility due to frequent display control can be prevented.

In addition, although the example in which the determination unit 104 performs determination of a user based on image information has been described in the above embodiments, the determination unit 104 may perform the determination of the user otherwise. For example, when a user holds a tag or an article with a QR Code®, a bar code, or the like attached, which contain information that enables the user to be identified, the determination unit 104 obtains information from the tag and performs determination of the user based on the obtained information. In this case, the determination process of the user may speed-up.

In addition, although the example in which the display object may be placed in any position on the display region has been described in the above embodiments, the display object may be displayed in a fixed position. For example, the display region may be partitioned into predetermined ranges and the display object may be placed in any one of the predetermined ranges designated. Note that the display object may replace a display object which is already placed, if any.

In addition, although examples in which the display region is rectangular in shape have been described in the above embodiments, the display region may be any of various other shapes such as polygonal, circular, or oval shape.

In addition, although examples in which the information processing apparatus 100 is a device having the projection unit 108 have been described in the above embodiments, the information processing apparatus 100 may be an information processing apparatus connected to a separate-bodied projection device. For example, the information processing apparatus 100 may be a server including the detection unit 102, a determination unit 104, and the control unit 106 and may be installed in a remote place from the imaging device 200 and the separate-bodied projection device.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing apparatus including:

a detection unit configured to detect a manipulation of displaying a display object related to an application or changing a display range of the display object in a display region;

a determination unit configured to determine a manipulating user who has performed the manipulation when the manipulation has been detected; and a control unit configured to select a display object to be controlled and displayed based on information related to the manipulating user.

(2)

The information processing apparatus according to (1), wherein the information related to the manipulating user includes association information in which a user is associated with a display object which has a predetermined relation with the user; and the control unit selects a display object to be controlled and displayed based on the association information.

(3)

The information processing apparatus according to (2), wherein the association information includes information in which a user who has generated a display object is associated with the display object; and the control unit selects a display object of which elapsed time from generation is longer than elapsed time from generation of the other display objects among display objects generated by the manipulating user.

(4)

The information processing apparatus according to (2), wherein the association information includes positional relation information indicating a positional relation between a display object associated with a user and the user; and the control unit selects a display object to be controlled and displayed based on the positional relation information on the manipulating user.

(5)

The information processing apparatus according to (4), wherein the positional relation information includes information indicating a distance between a display object associated with a user and the user; and the control unit selects a display object which is specified based on the information indicating the distance among display objects associated with the manipulating user.

(6)

The information processing apparatus according to (2), wherein the association information includes user state information indicating a state of a user with respect to a display object associated with the user; and the control unit selects a display object to be controlled and displayed based on the user state information on the manipulating user.

(7)

The information processing apparatus according to (6), wherein the user state information includes information indicating presence or absence of a motion of a user with respect to the display object associated with the user; and the control unit selects a display object which is specified based on the presence or absence of the motion among display objects associated with the manipulating user.

(8)

The information processing apparatus according to any one of (2) to (7), wherein the control unit selects a display object to be controlled and displayed based on the association information on the manipulating user and a user different from the manipulating user.

(9)

The information processing apparatus according to (8), wherein the association information includes user characteristic information indicating a characteristic of a user; and the control unit selects a display object to be controlled and displayed based on the user characteristic information.

(10)

The information processing apparatus according to (9), wherein the user characteristic information includes information indicating a physical characteristic of a user the control unit selects a display object which is specified based on the physical characteristic of the user among display objects associated with the user.

(11)

The information processing apparatus according to any one of (1) to (10), wherein the control unit further selects a display object to be controlled and displayed based on application characteristic information indicating a characteristic of an application related to a display object.

(12)

The information processing apparatus according to (11), wherein the application characteristic information includes information indicating a manipulation characteristic of an application; and the control unit selects a display object related to the application whose manipulation characteristic satisfies a predetermined condition.

(13)

The information processing apparatus according to any one of (1) to (12), wherein the control unit changes a display position of the selected display object.

(14)

The information processing apparatus according to any one of (1) to (12), wherein the control unit changes a size of the selected display object.

(15)

The information processing apparatus according to (13) or (14), wherein the control unit changes a degree of change according to a user associated with the display object.

(16)

The information processing apparatus according to any one of (1) to (12), wherein the control unit terminates display of the selected display object.

(17)

An information processing method including:

detecting a manipulation of displaying a display object related to an application or changing a display range of the display object in a display region;

determining a manipulating user who has performed the manipulation when the manipulation has been detected; and selecting a display object to be controlled and displayed based on information related to the manipulating user.

(18)

A program causing a computer to implement:

a detection function configured to detect a manipulation of displaying a display object related to an application or changing a display range of the display object in a display region;

a determination function configured to determine a manipulating user who has performed the manipulation when the manipulation has been detected; and a control function configured to select a display object to be controlled and displayed based on information related to the manipulating user.

REFERENCE SIGNS LIST 100 information processing apparatus
102 detection unit
104 determination unit
106 control unit
108 projection unit
200 imaging device

The invention claimed is:

1. An information processing apparatus comprising:
a detection unit configured to detect a manipulation of displaying a display object related to an application or changing a display range of the display object in a display region;
a determination unit configured to determine a manipulating user who has performed the manipulation when the manipulation has been detected; and
a control unit configured to select a display object to be controlled and displayed based on information related to the manipulating user,
wherein the information related to the manipulating user includes association information in which a user is associated with a display object which has a predetermined relation with the user,
wherein the association information includes information in which a user who has generated a display object is associated with the display object,
wherein the control unit further selects, from among display objects generated by the manipulating user, a display object of which elapsed time from generation is longer than elapsed time from generation of other display objects,
wherein the control unit changes a display position of the further selected display object, and
wherein the detection unit, the determination unit, and the control unit are each implemented via at least one processor.

2. The information processing apparatus according to claim 1, wherein
the association information includes positional relation information indicating a positional relation between a display object associated with a user and the user, and
the control unit further selects, from among display objects generated by the manipulating user, a display object to be controlled and displayed based on the positional relation information on the manipulating user.

3. The information processing apparatus according to claim 2, wherein
the positional relation information includes information indicating a distance between a display object associated with a user and the user, and
the control unit further selects, from among display objects generated by the manipulating user, a display object which is specified based on the information indicating the distance among display objects associated with the manipulating user.

4. The information processing apparatus according to claim 1, wherein
the association information includes user state information indicating a state of a user with respect to a display object associated with the user, and
the control unit further selects, from among display objects generated by the manipulating user, a display object to be controlled and displayed based on the user state information on the manipulating user.

5. The information processing apparatus according to claim 4, wherein
the user state information includes information indicating presence or absence of a motion of a user with respect to the display object associated with the user, and
the control unit further selects, from among display objects generated by the manipulating user, a display object which is specified based on the presence or absence of the motion among display objects associated with the manipulating user.

6. The information processing apparatus according to claim 1, wherein
the control unit further selects, from among display objects generated by the manipulating user, a display object to be controlled and displayed based on the association information on the manipulating user and a user different from the manipulating user.

7. The information processing apparatus according to claim 6, wherein
the association information includes user characteristic information indicating a characteristic of a user, and
the control unit further selects, from among display objects generated by the manipulating user, a display object to be controlled and displayed based on the user characteristic information.

8. The information processing apparatus according to claim 7, wherein
the user characteristic information includes information indicating a physical characteristic of a user, and
the control unit further selects, from among display objects generated by the manipulating user, a display object which is specified based on the physical characteristic of the user among display objects associated with the user.

9. The information processing apparatus according to claim 1, wherein
the control unit further selects, from among display objects generated by the manipulating user, a display object to be controlled and displayed based on application characteristic information indicating a characteristic of an application related to a display object.

10. The information processing apparatus according to claim 1, wherein the control unit changes a size of the further selected display object.

11. The information processing apparatus according to claim 1, wherein the control unit changes a degree of change according to a user associated with the display object.

12. The information processing apparatus according to claim 1, wherein the control unit terminates display of the further selected display object.

13. An information processing apparatus comprising:
a detection unit configured to detect a manipulation of displaying a display object related to an application or changing a display range of the display object in a display region;
a determination unit configured to determine a manipulating user who has performed the manipulation when the manipulation has been detected; and
a control unit configured to
select a display object to be controlled and displayed based on information related to the manipulating user, and
further select, from among display objects generated by the manipulating user, a display object to be controlled and displayed based on application characteristic information indicating a characteristic of an application related to a display object, wherein the information related to the manipulating user includes association information in which a user is associated with a display object which has a predetermined relation with the user, wherein the application characteristic information includes information indicating a manipulation characteristic of an application, wherein the control unit further selects, from among display objects generated by the manipulating user, a display object related to the application whose manipulation characteristic satisfies a predetermined condition, wherein the control unit changes a display position of the display object related to the application whose manipulation characteristic satisfies the predetermined condition, and wherein the detection unit, the determination unit, and the control unit are each implemented via at least one processor.

14. An information processing method comprising:

detecting a manipulation of displaying a display object related to an application or changing a display range of the display object in a display region;

determining a manipulating user who has performed the manipulation when the manipulation has been detected;

selecting a display object to be controlled and displayed based on information related to the manipulating user, wherein the information related to the manipulating user includes association information in which a user is associated with a display object which has a predetermined relation with the user, and wherein the association information includes information in which a user who has generated a display object is associated with the display object;

further selecting, from among display objects generated by the manipulating user, a display object of which elapsed time from generation is longer than elapsed time from generation of other display objects; and changing a display position of the further selected display object.

15. A non-transitory computer-readable medium having embodied thereon a program, which when executed by a computer causes the computer to execute a method, the method comprising:

detecting a manipulation of displaying a display object related to an application or changing a display range of the display object in a display region;

determining a manipulating user who has performed the manipulation when the manipulation has been detected;

selecting a display object to be controlled and displayed based on information related to the manipulating user, wherein the information related to the manipulating user includes association information in which a user is associated with a display object which has a predetermined relation with the user, and wherein the association information includes information in which a user who has generated a display object is associated with the display object;

further selecting, from among display objects generated by the manipulating user, a display object of which elapsed time from generation is longer than elapsed time from generation of other display objects; and changing a display position of the further selected display object.

* * * * *